United States Patent [19]

Crawford et al.

[11] Patent Number: 4,780,198

[45] Date of Patent: Oct. 25, 1988

[54] HYBRID HIGH RATE ANAEROBIC TREATMENT APPARATUS

[75] Inventors: George V. Crawford, Toronto; Paul F. Dasilva, Markham, both of Canada

[73] Assignee: Gore & Storrie Ltd., Toronto, Canada

[21] Appl. No.: 8,338

[22] Filed: Jan. 29, 1987

Related U.S. Application Data

[62] Division of Ser. No. 716,221, Mar. 26, 1985, Pat. No. 4,676,906.

[51] Int. Cl.$^4$ ............................................. C02F 11/04
[52] U.S. Cl. .................................... 210/151; 210/180; 210/188; 210/539
[58] Field of Search ............... 210/603, 150, 151, 180, 210/188, 319, 539

[56] References Cited

U.S. PATENT DOCUMENTS

| | | | |
|---|---|---|---|
| 4,092,338 | 5/1978 | Tossey | 210/603 X |
| 4,293,421 | 10/1981 | Green | 210/603 |
| 4,311,593 | 1/1982 | Benjes et al. | 210/615 X |
| 4,315,823 | 2/1982 | Witt et al. | 210/615 X |
| 4,351,729 | 9/1982 | Witt | 210/603 |
| 4,482,458 | 11/1984 | Rovel et al. | 210/603 |
| 4,505,819 | 3/1985 | Barnes et al. | 210/603 |
| 4,530,762 | 7/1985 | Love | 210/603 |
| 4,632,758 | 12/1986 | Whittle | 210/603 |

OTHER PUBLICATIONS

G. Lettinga, S. W. Hobma, L. W. Hulshoff Pol, W. de Zeeuw, P. de Jong, P. Grin & R. Roersma–Department of Water Pollution Control.

Mr. George V. Crawford, Project Manager High Rate Anaerobic Treatment Technology–Mar. 29, 1984.

Mr. Eric R. Hall, Environment Canada Improving Hydraulic Efficiency and High Rate Anaerobic Systems––Dec., 1984.

Mr. Mogens Henze & Mr. Poul Harremoes–Department of Environment Engineering Anaerobic Treatment of Wastewater in Fixed Film Reactors–a Literature Review, Wat. Sci. Tech., vol. 15, pp. 1–101.

Design Operation and Economy of Anaerobic Treatment, Wat. Sci. Tech. vol. 15, pp. 177–195.

*Primary Examiner*—Tom Wyse
*Attorney, Agent, or Firm*—Murray and Whisenhunt

[57] ABSTRACT

An anaerobic reactor for treatment of waste water comprises a primary reactor or zone of the suspended growth type and a secondary reactor or zone of the fixed filter bed type disposed directly above and in liquid contact with the primary reactor. Liquid to be treated is fed continuously into the primary reactor and moves upwardly through the primary reactor, then through the filter bed and out via an outlet above the filter bed. Gas generated in the primary reactor moves upwardly through the liquids and through the filter bed, to cause vertical mixing throughout the zones and to keep the filter bed from clogging.

7 Claims, 2 Drawing Sheets

HYBRID HIGH RATE ANAEROBIC TREATMENT APPARATUS

This application is a division of Ser. No. 716,221, filed Mar. 26, 1985, now U.S. Pat. No. 4,676,906.

FIELD OF THE INVENTION

This invention relates to high rate anaerobic treatment technology and more specifically to a hybrid anaerobic treatment process and apparatus.

Anaerobic waste water treatment processes offer several advantages over aerobic treatment processes in that they have lower energy requirements and can greatly reduce the quantities of sludge generated for ultimate disposal. Moreover, one of the end products of anaerobic treatment is a combustible gas, which can be used as an energy source.

BACKGROUND OF THE INVENTION

The anaerobic digestion process is a two stage process involving hydrolyzing, acid forming, and methane forming bacteria. In the first stage, the hydrolyzing and acid forming bacteria convert volatile solid materials to soluble compounds and then to various volatile fatty acids such as acetic acid, generating carbon dioxide and hydrogen in the process. In the second stage, the methane forming bacteria convert the volatile fatty acids to methane and carbon dioxide, and also combine carbon dioxide with hydrogen to form methane and water.

With many wastes, the waste components are largely soluble, and the conversion of volatile solids material to soluble compounds is not critical.

The overall reaction is as follows:

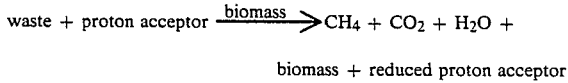

$$\text{waste} + \text{proton acceptor} \xrightarrow{\text{biomass}} CH_4 + CO_2 + H_2O +$$

biomass + reduced proton acceptor

The proton acceptor may be $NO_3-$, which is reduced to $NO_2-$, $N_2O$, or $N_2$. If $SO_4--$ is present, it will be reduced to $H_2S$.

Depending on the waste composition, the rate limiting step in the reaction may be either volatile solids conversion or methane production. Many industrial and food processing wastes contain significant soluble compounds but relatively less volatile solids materials. The rate limiting step in the reaction of these wastes is the methane production step. The methane forming bacteria are sensitive to temperature, food, and pH conditions so that these conditions should be optimized so as to increase the overall rate of the process. Thus, anaerobic digestion is usually carried out at 25°C.–40° C., preferably at about 35° C. Anaerobic digestion can also occur from 15° C. to 60° C. The pH of the process at steady state is normally around 6.8, although it can range from 6.0 to 8.0. Large changes in system temperature or pH can deactivate the methane-forming bacteria, but if the system returns to ideal conditions these bacteria will become active again.

BRIEF REFERENCE TO THE PRIOR ART

Several processes and reactor types are known for anaerobic waste water treatments. One of these is the anaerobic filter process. In this process there is provided a fixed supporting medium such as rocks, ceramic pieces, wood pieces, plastic pieces or the like, on which the sludge containing the microorganisms is grown, and in the interstitial spaces of which the sludge is grown, and the waste water is passed through the medium in the manner of a filter. The contact time can be adjusted by adjustment of the depth of the bed and the rate of flow of the waste water therethrough. Whilst the process is efficient in that it gives high COD reductions when operated at high rates, it suffers from the disadvantage that the bed tends to become filled with solids after a time. This occurs due to sludge growth, inorganic precipitation and high solids contents in the waste water. When the filter bed accumulates excess solids, it loses efficiency, the contact time of the waste water with the sludge in the filter bed during a continuous flow process being undesirably reduced.

Another known process is the anaerobic contact process in which sludge containing the microorganisms is suspended in a liquid medium to which the waste water is fed, solids/liquid separation being undertaken in a separate vessel and the solids, which include the sludge, being recycled. This process tends to suffer from the problem of inefficient solids/liquid separation in the second vessel, resulting in solids losses, especially when conducted at high rates.

SUMMARY OF THE INVENTION

It is an object of the present invention to provide a novel high rate anaerobic waste water treatment process and apparatus which reduces or overcomes at least one of the disadvantages of the known systems.

The present invention provides a process and apparatus which combines the advantageous features of the anaerobic filter process and the anaerobic contact process and at the same time substantially reduces the disadvantagess of both. According to the invention, the waste water is first fed to a lower zone or primary reactor containing suspended anaerobic sludge with the appropriate microorganisms. Anaerobic treatment commences in this lower zone, with generation of gases, in the manner of the contact process. Above the primary reactor, which is effectively a suspended growth zone, there is provided an anaerobic filter bed, supported on a grating or similar liquid permeable support. The waste water under treatment passes upwardly from the primary reactor through the filter bed, where it contacts further quantities of anaerobic sludge for further treatment. The treated water then exits from above the filter bed.

Thus, the gases generated in the suspended growth zone rise up through the liquid therein, to the filter bed, and pass through the filter bed, in a turbulent manner thereby counteracting the tendency of the filter bed to become filled with solids. Moreover, the rising gases generated in both the suspended growth zone and the filter bed zone provide a vertical mixing effect, extending through the primary reactor or suspended growth zone and up into the filter bed (the secondary reactor). This vertical mixing tends to reduce excesses of pH discrepancies between the two zones, and promote stable, steady state conditions. The vertical mixing also induces a downward flow of liquid in some areas, causing the return of solids from the secondary reactor to the primary reactor. If, as commonly happens, the gas bubbles generated in the primary reactor attach themselves to solid particles therein, e.g. the sludge particles active therein, they will cause these to rise also. However, the filter bed, or the grating upon which it is supported, in the secondary reactor acts as an obstruction to free solids passage, so that the gas bubbles become detached from the solids at the impact and the solids drop back into the primary reactor. Moreover, some of the naturally buoyant solids borne along by the upflow of the liquid in continuous steady state operation of the process will be retained in the secondary reactor or filter bed by entrapment with other sludge masses in the interstitial spaces between the filter media pieces. Because of the vertical mixing, these solids can return to the primary reactor or suspended growth zone. These features reduce the common problem encountered with contact reactors, of excess solids losses to the effluent.

DESCRIPTION OF THE PREFERRED EMBODIMENTS

The microorganisms employed in the process of the invention are preferably the same as those commonly employed in anaerobic sludge digestion processes. Both stages of the process, namely formation of solubles and acids followed by methane formation, take place in both zones, the suspended growth zone or primary reactor and the filter bed or secondary reactor. Thus the sludges in both zones contain the same microorganisms, inevitably, because of the free liquid communication between them, establishing equilibrium or at least steady state conditions. Non-attached, suspended growth types are naturally favoured in the suspended growth zone (primary reactor) whereas, in the filter bed, more growth of attached organisms is naturally promoted, but the same functional organisms are present in both zones. It is a further advantageous feature of the process of the present invention that each reactor zone effectively provides a reservoir of active microoganisms for the other. Thus, in the event of a sudden change in the nature of the incoming waste water into the primary reactor due to upstream variations or errors, which might initially kill some or all of the desired microorganisms therein, the stock will be replenished and steady state resumed by supply of organisms from the filter bed. Similarly, in the event of a sudden surge of liquid through the filter bed, or other exceptional process conditions having the effect of washing out or killing substantial numbers of the microorganisms from the filter bed, it can be re-seeded from the suspended growth zone or primary reactor.

Another advantageous feature of the invention is the ability of the apparatus to operate efficiently for long periods of time before cleaning or purging of solids is required. An anaerobic filter process runs efficiently in the early stages of operations and less efficiently as the filter bed accumulates excess solids, whereas an anaerobic contact process runs less efficiently in its early operation and improves in operation as solids accumulate. By combining the two processes, the present invention is efficient during both the early and later stages of operation.

In the preferred apparatus according to the invention, the primary and secondary reactors or zones are provided vertically above one another, e.g. as two parts of a cylindrical tank separated only by the grating supporting the filter bed. Liquid contact between the zones is provided over substantially the whole mutual surface areas thereof. The volume of the primary reactor or suspended growth zone should be at least as large as, and preferably larger than, the volume of the secondary reactor, to allow the adequate relative residence times in the two zones for the desired reactions, gas production, mixing and solids movement to occur.

Preferably also, agitation and liquid distribution means are provided in the primary reactor, to supplement the agitation and mixing cauesd by the rising gas flow through the two zones. Conveniently, the agitation means comprises a system of inlet and outlet ports, spaced around the periphery of the primary reactor, through which liquid can be circulated and recirculated to effect agitation. Preferably also, the waste will be introduced to the reactor through the inlet ports, in a sequential manner, to provide the effective distribution of flow to the primary reactor. With smaller reactors, the number of inlet and outlet ports can be reduced, even to a single port.

The temperature and pH conditions of operation of the process of the present invention are generally in accordance with known anaerobic treatment processes, e.g. temperatures of liquid undergoing treatment of from about 15° C.–60° C., and pH of from about 6–8.

BRIEF REFERENCE TO THE DRAWINGS

SPECIFIC DESCRIPTION OF THE PREFERRED EMBODIMENT

Figure 1:
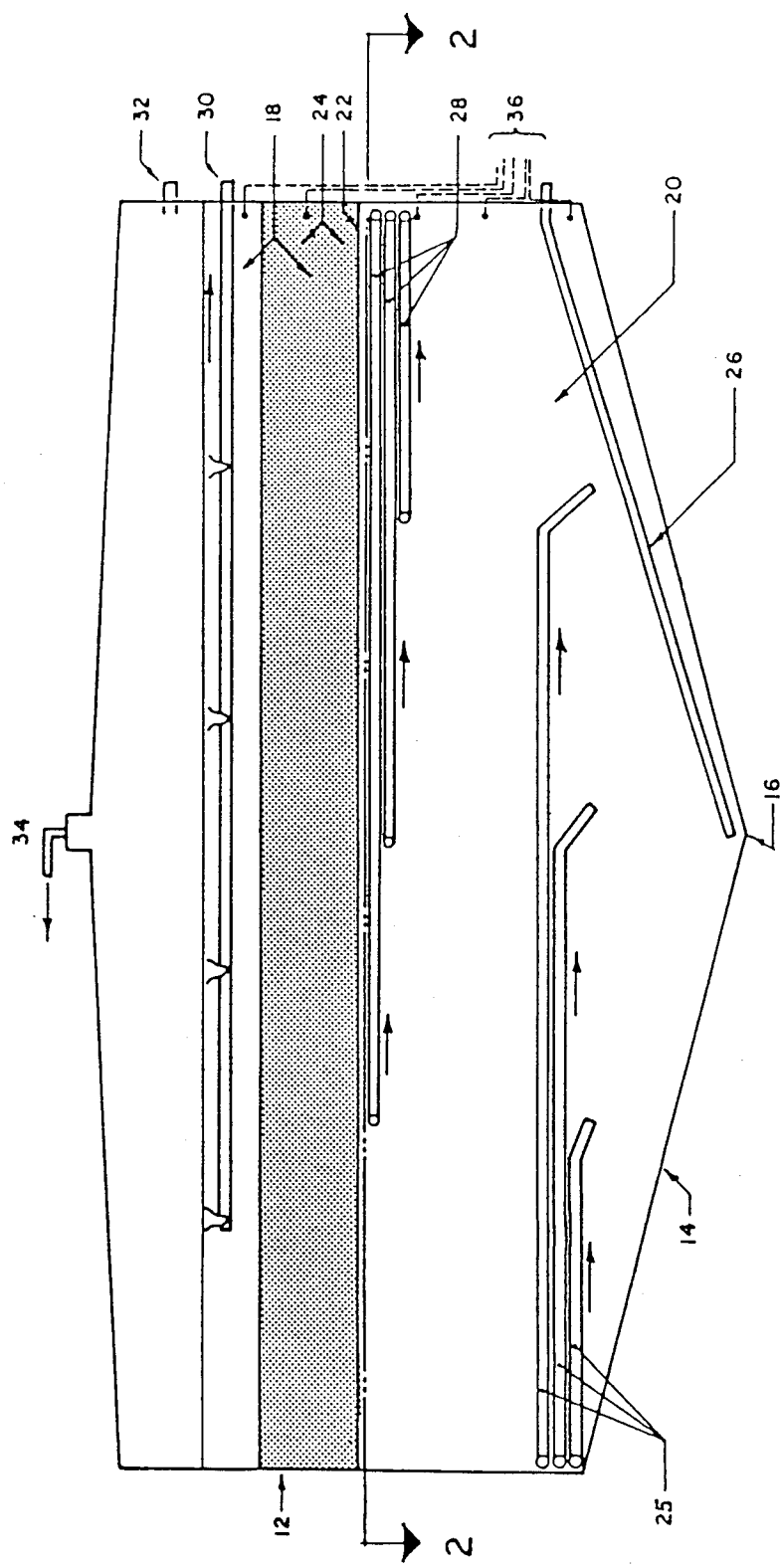
FIG. 1 is a vertical cross-sectional view of a reactor apparatus according to the preferred embodiment of the invention.

As can be seen in FIG. 1, the reactor apparatus has a generally cylindrical hollow body 12 and a conical bottom end 14 terminating in an apex 16. The apparatus 12 comprises upper and lower reactors or zones, 18 and 20 respectively, separated by a grating 22 on which is supported, in the upper zone 18, a filter bed 24 of thermoplastic rings on which anaerobic sludge is attached and grown. The upper zone 18 includes the filter bed 24 and thus constitutes a secondary reactor of the anaerobic fixed bed type.

The lower reactor 20 is of greater volume than the upper secondary reactor or zone 18, and contains waste water to be treated, and anaerobic sludge suspended therein. The lower reactor or zone 20 thus constitutes a primary reactor of the anaerobic contact type, in liquid communication over substantially its entire surface area with the upper reaction zone 18, at the grating 22. The primary reactor 20 defines a suspended growth zone in which growth of suspended sludge particles can occur. It includes a plurality of waste water inlet pipes 25 distributed around the periphery of the reactor 20 and near the bottom thereof (see also FIG. 2). The ends of pipes 25 within the reactor 20 are inclined downwardly as shown but can be horizontal to induce a lateral flow. There is also included a draining and seeding pipeline 26, extending to the apex 16, to allow seed bacteria to be fed into the reactor or excess solids removed, when required.

Figure 2:
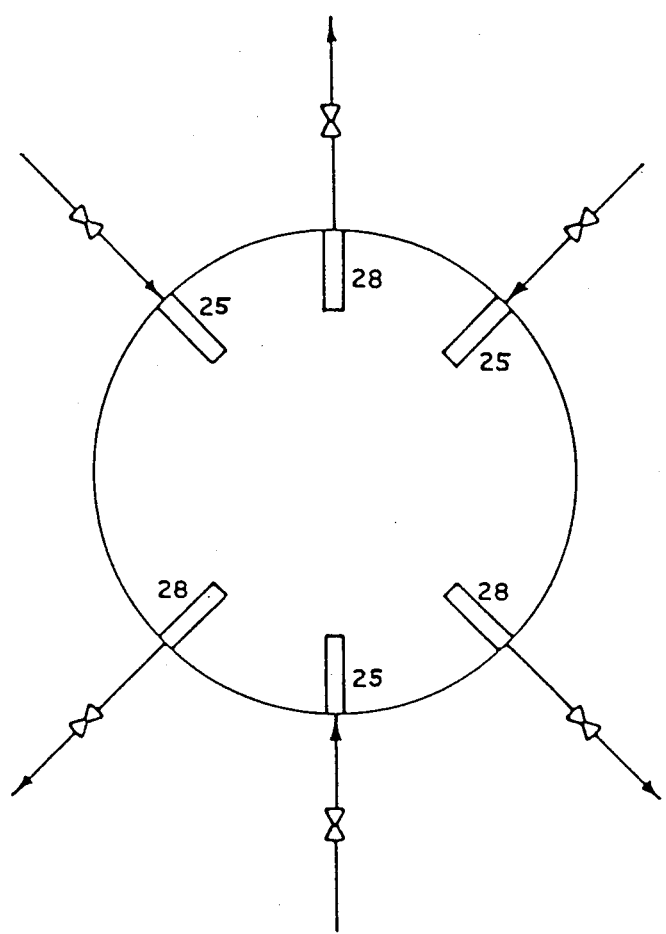
FIG. 2 is a horizontal cross-sectional view of the reactor apparatus of FIG. 1, taken along the line 2—2 of FIG. 1.

Lower reactor 20 is also provided, at its upper portion just below the grating 22, with a plurality of liquid withdrawal pipes 28, the ends of which are spaced around the inner periphery of the reactor 20. The relative disposition of the ends of inlet pipes 25 and withdrawal pipes 28 is generally as shown in FIG. 2, namely, an inlet pipe end is diametrically opposite to a withdrawal pipe end. By means of appropriate valving and interconnection, an inlet pipe 25 can be connected to its diametrically opposed withdrawal pipe 28 and waste water recirculated by pumping therebetween, so that the pipe system constitutes an agitation means for the reactor.

The upper, secondary reactor or zone 18 is disposed vertically above the primary reactor 20, and contains the filter bed 24. Above the filter bed 24 is provided an effluent outlet 30 in the form of a horizontal piping arrangement having points, such as upturned pipe elbows or other fittings, where the liquid can overflow into the piping and thereby leave the apparatus. Above outlet 30 is an emergency overflow 32, often required for safety purposes, and an uppermost gas outlet 34. Both the upper reactor 18, and the lower reactor 20 are provided with appropriate sensing and sampling means 36 shown in FIG. 1 in broken line.

In operation, waste water to be treated, at a suitable temperature such as 35° C., is pumped continuously into the primary reactor zone 20 through inlet pipes 25, encountering and reacting with anaerobic sludge, so that hydrogen, carbon dioxide and methane gas bubbles are generated in zone 20. The liquid flows upwardly through grating 22 and filter bed 24 in upper secondary reactor zone 18, encountering and reacting with more anaerobic sludge in the filter bed 24. Treated liquid then exits via effluent outlet 30, in a suitably cleansed and purified condition.

During the treatment, gas generated in lower zone 20 rises, and passes into and through filter bed 24 and out to collection through outlet 34. As it rises, it causes a degree of vertical agitation throughout both zones of the apparatus, thereby assisting in the maintenance of uniform and steady state conditions therethrough, similar pH values and reactant concentrations at various levels, replenishment of microorganisms in the lower zone, etc. It also assists, during its passage through filter bed 24, in dislodgement of excess deposited solids therein, so as to help prevent clogging of the filter bed. Solids particles which rise from the lower zone 20, e.g. in association with rising gas bubbles, are effectively prevented from passing through the filter bed, and perhaps contributing to the clogging thereof, by the grating 22 and the media in the filter bed. On impact with the grating and media, the gas bubbles are detacted from the solid particles to continue upwards through the filter bed 24, while the residual solid particles have lost their buoyancy and hence sink.

Agitation in the lower zone 20 is supplemented from time to time by use of the withdrawal pipes 28 and inlet pipes 25. Waste water from within zone 20 is recycled by suction from a withdrawal pipe 28 to a diametrically opposed inlet pipe 25, to cause agitation in the zone 20. Since the inlet pipes are disposed vertically below the withdrawl pipes, this also contributes to the vertical mixing effect and downward return of solids and liquid desirable to keep the filter bed 24 unplugged and to sustain steady state conditions. Incoming feed can be introduced with the recycled flow to the inlet pipes, or separately to the bottom of zone 20.

The apparatus and process as illustrated operates efficiently and over extended periods of time to reduce BOD and COD in waste water from a wide variety of sources, including municipal and industrial wastes, especially from plants handling organic compounds such as food processors. Such waste waters are commonly already at a suitable temperature, following previous subjection to pressure cooking, blanching, thermal conditioning, vacuum filtration and the like. Typically, an apparatus according to the present invention has a total volumentary capacity of 7000 cubic meters, and employs residence times for waste water therein of 48 hours in the primary reactor and 16 hours in the secondary reactor.

Variations in the design and operation of the apparatus and process from that specifically described are of course possible and are within the scope of the present invention. For example, the filter medium of the filter bed used in the secondary reactor can be any of the stable inert substances known as suitable in standard anaerobic fixed filter beds. The dimensions, numbers and shapes of the reactor components can be varied. The reactor could have a flat bottom or could have hoppers in the bottom instead of having a conical bottom end 14. Also, the relative disposition of the ends of inlet pipes 25 and withdrawal pipes 28 can be changed.

The operation of the process of the preferred embodiment of the invention is illustrated in the following specific example.

EXAMPLE

An anaerobic hybrid reactor was constructed according to the design of the reactor of the preferred embodiment of the invention, as illustrated in the accompanying drawing. The filter bed packing material was thermoplastic Raschig rings.

The dimensions of this reactor are given in Table I.

TABLE I

| Reactor Dimensions | |
|---|---|
| Volume of primary | 10.1 L |
| Volume of secondary | 6.6 L |
| Total Reactor Volume | 16.7 L |
| Filter Section Initial Void Volume | 5.9 L |

The waste water fed to the reactor was a thermal conditioning liquor, produced as a by-product of sludge processing, and having the characteristics given in Table II below.

It was fed into the reactor at an average rate of 13L/day, coded to temperature of about 35° C. This rate of feed gave a residence time in the primary, lower reactor of about 18.6 hrs, and a residence time in the upper, secondary reactor of about 10.9 hrs.

TABLE II

| | Waste Water Composition | |
|---|---|---|
| | Concentration (mg · $L^{-1}$) | |
| Parameter | Means | 90%* |
| COD | 11,000 | 15,500 |
| COD-filtered | 10,700 | 15,000 |
| BOD | 5,500 | 7,500 |
| BOD-filtered | 5,300 | 7,000 |
| TKN | 875 | 1,110 |
| $NH_4$—N | 300 | 500 |
| Total P | 65 | 88 |
| Suspended Solids | 150 | 520 |
| Volatile Acids | 1,430 | 2,200 |
| pH | 4–5 | |
| Alkalinity | 1414 | |

*90% of observations less than value indicated.

During periods of the experiment, the feed COD and feed BOD- filtered averaged as low as 500 mg/L and 2,200 mg/L respectively.

The reactor conditions after a period of operation of several months are summarised in Table III.

TABLE III

| Reactor Conditions | |
|---|---|
| feed COD | 5000 m/L |

TABLE III-continued

| Reactor Conditions | |
|---|---|
| feed $BOD_5$ - filtered | 2200 mg/L |
| COD load | 65 g/day |
| reactor loading rate | 4.1 g COD/per liter of initial void volume per day |
| reactor loading rate (based on filter only) | 11 g COD/per liter of initial void volume per day |
| effluent $BOD_5$ - filtered | 200 mg/L |
| removal of $BOD_5$ - filtered | 91% |
| pH at steady state | 7.3–8.0 |

From Table III, it can be seen that the hybrid reactor performed well in terms of $BOD_5$ removal. After operating continuously for very extended periods of time, there was no sign of plugging of the filter bed.

We claim:

1. Apparatus for anaerobic biological treatment of waste water comprising:
a lower primary reactor containing a suspension of anaerobic sludge for waste water treatment, said reactor having liquid inlet means for introducing waste water therein;
an upper secondary reactor disposed vertically above said primary reactor and in liquid and gas communication with said primary reactor over a substantial portion of an upper surface area thereof, said primary reactor having at least as large a volumetric capacity as said secondary reactor;
filter bed means provided in said secondary reactor for retaining anaerobic sludge for waste water treatment;
liquid outlet means disposed above said filter bed means for withdrawing treated waste water from said secondary reactor;
gas outlet means disposed above said filter bed for withdrawing gases from said secondary reactor; and
agitation means disposed in said primary reactor and comprising a plurality of liquid withdrawal means spaced around an upper portion of said primary reactor, and a plurality of liquid infeed means spaced around a lower portion of said primary reactor, said liquid withdrawal means and said liquid infeed means each comprising a plurality of horizontally extending pipes, said primary reactor, apart from said horizontally extending pipes, being substantially free from structure obstructing upward flow of liquid and gases through said primary reactor to said secondary reactor.

2. Apparatus according to claim 1, wherein said primary reactor and said secondary reactor are in mutual liquid communication with one another at their respective upper and lower surfaces over substantially the entire surface area thereof.

3. Apparatus according to claim 1, wherein selected ones of said liquid withdrawal means and said liquid infeed means are interconnected exteriorly of said primary reactor to provide simultaneous liquid withdrawal and infeed therethrough to effect agitation of liquid in said primary reactor.

4. Apparatus according to claim 3, wherein said selected ones of said liquid withdrawal means and said liquid infeed means are substantially diametrically opposed to one another.

5. Apparatus according to claim 1, wherein said primary reactor and said secondary reactor are of substantially the same cross-sectional shape and area, and constitute respective lower and upper zones of a unitary apparatus through which liquid and gas may move on a continuous upflow basis.

6. Apparatus according to claim 5, wherein a lower surface of said secondary reactor is constituted by a liquid and gas permeable support structure on which said filter bed means is supported.

7. Apparatus according to claim 1, wherein said gas outlet means is disposed only above said filter bed means so that gas is only withdrawn from said primary reactor and said secondary reactor above said filter bed means.

* * * * *